United States Patent [19]
Hsiung

[11] Patent Number: 5,560,502
[45] Date of Patent: Oct. 1, 1996

[54] COLLAPSIBLE CLOSET FRAME STRUCTURE

[76] Inventor: Yu-Kuang Hsiung, Hsi-k'eng No. 1-1, 18 Lin, Tsao-ch'iao Ts'un, Tsao-ch'iao Hsiang, T'ao-yuan Hsien R.O.C., Taiwan

[21] Appl. No.: 349,086

[22] Filed: Dec. 2, 1994

[51] Int. Cl.[6] .................................................. A47F 5/00
[52] U.S. Cl. ...................................................... 211/195
[58] Field of Search ................................ 211/195, 198, 211/189, 182

[56] References Cited

U.S. PATENT DOCUMENTS

| | | | |
|---|---|---|---|
| 1,655,593 | 1/1928 | Bulman | 211/195 |
| 4,523,768 | 6/1985 | Dlubala | 211/195 |
| 5,150,484 | 9/1992 | Whitten, Jr. | 211/189 X |
| 5,351,843 | 10/1994 | Wichman et al. | 211/195 |

*Primary Examiner*—Alvin C. Chin-Shue
*Assistant Examiner*—Sarah L. Purol

*Attorney, Agent, or Firm*—Ostrolenk, Faber, Gerb & Soffen, LLP

[57] ABSTRACT

A collapsible closet frame includes two upright front posts and two upright rear posts connected together at both their upper ends and lower ends with two pairs of parallel horizontal bars by means of corner members in a pivotable manner so as to form a parallelepiped structure. At each of the upper and lower ends of the rear posts, a brace is mounted and extending toward a brace joint to pivot thereto. Each of the two front posts and the horizontal bars on a front plane defined by the front posts is constituted by two sections which are foldably jointed by a front joint member and each of the two rear posts and the horizontal bars on a rear plane defined by the rear posts is constituted by two sections which are detachably jointed by a rear joint member so that by separating the posts and bars located on the rear plane and then folding the post and bars located on the front plane about the corner members and front joint members and collapsing the braces about the brace joint, the parallelepiped structure is collapsed from an expanded position to a collapsed position which occupies only a very limited space.

13 Claims, 9 Drawing Sheets

COLLAPSIBLE CLOSET FRAME STRUCTURE

FIELD OF THE INVENTION

The present invention relates generally to a closet and in particular to a collapsible closet frame structure which can be folded and thus stored in a very limited space.

BACKGROUND OF THE INVENTION

Conventional closets are usually made of woods. The wooden rods and plates that form a closet are usually secured together by means of fasteners, such as nails and screws. Some of the recently-developed closets are made of metal of which the parts are usually welded or screw-tightened together. Another type closet comprises a frame made of metal or plastic and covered with a soft, sheet-like material and closet of this type also requires fasteners to secure the structure. All these closets are not collapsible and thus occupying a great space when not in use. Further, due to the un-collapsibility of the conventional closets, it is also very difficult to move, especially for long distance transportation. Besides, separate fasteners are required in constructing these conventional closets.

It is therefore desirable to provide a collapsible closet frame structure which can be folded and thus occupying only a very limited space when not in use so as to overcome the deficiencies of the prior art.

SUMMARY OF THE INVENTION

The primary object of the present invention is to provide a collapsible closet frame structure which can be folded to occupy only a limited space when not in use so as to enhance the storage and transportation of the closets.

It is a further object of the present invention to provide a closet frame structure which requires no separate fasteners to construct the closet so as to enhance the usage of the closet.

To achieve the above objects, in accordance with the present invention, there is provided a collapsible closet frame structure comprising two upright front posts and two upright rear posts connected together at both their upper ends and lower ends with two pairs of parallel horizontal bars by means of corner members in a pivotable manner so as to form a parallelepiped structure. At each of the upper and lower ends of the rear posts, a brace is mounted and extending toward a centrally-located brace joint to pivot thereto. Each of the two front posts and the horizontal bars on a front plane defined by the front posts is constituted by two sections which are foldably jointed by a front joint member and each of the two rear posts and the horizontal bars on a rear plane defined by the rear posts is constituted by two sections which are detachably jointed by a rear joint member so that by separating the posts and bars located on the rear plane and then folding the post and bars located on the front plane about the corner members and the front joint members and collapsing the braces about the brace joint, the parallelepiped structure is collapsed from an expanded position to a collapsed position which occupies only a very limited space.

BRIEF DESCRIPTION OF THE DRAWINGS

The present invention, will better understood from the following description of a preferred embodiment of the present invention, with reference to the attached drawings, wherein.

DETAILED DESCRIPTION OF THE PREFERRED EMBODIMENT

Figure 1:
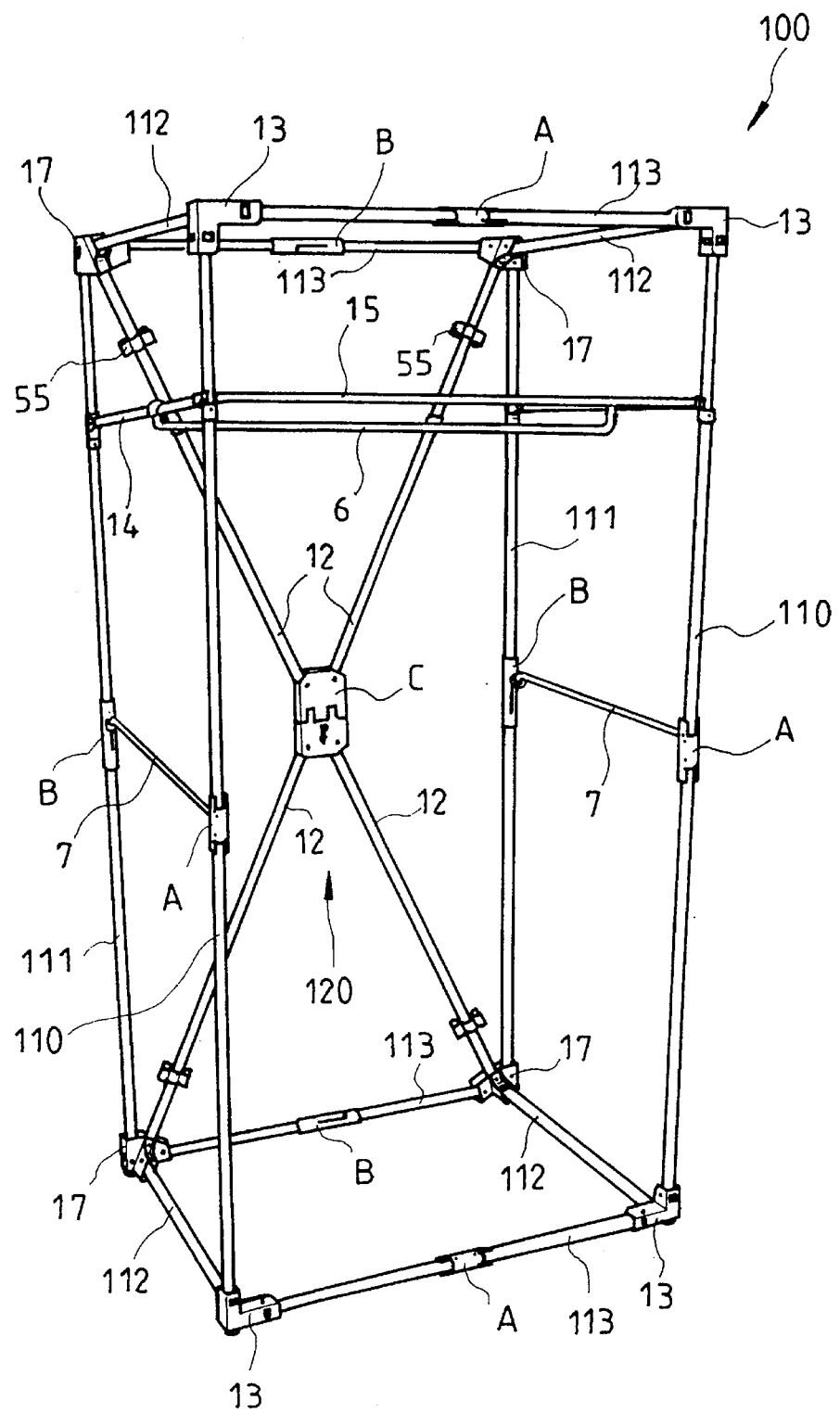
FIG. 1 a perspective view showing a collapsible closet frame structure constructed in accordance with the present invention.

With reference to the drawings, and in particular to FIG. 1, wherein a preferred embodiment of a collapsible closet frame structure in accordance with the present invention, generally designated with the reference numeral 100, is shown, the collapsible closet frame structure 100 is preferably a parallelepiped structure having two upright front posts 110 and two upright rear posts 111, respectively disposed at four corners of the parallelepiped structure of the closet frame 100 and connected together at both upper ends and lower ends thereof with two pairs of parallel-disposed horizontal bars 112 and 113 so as to form the parallelepiped structure.

Each of the upright front posts 110 comprises an upper section 110U and a lower section 110L foldably jointed at a front joint member A. Similarly, each of the upright rear posts 111 comprises an upper section 111U and a lower section 111L detachably jointed at a rear joint member B, which is preferably substantially flush with the front joint members A.

The horizontal bars 113 that are located on a rear plane defined by the upright rear posts 111 are each constituted by two sections detachably jointed together by means of the rear joint member B. Similarly, the horizontal bars 113 that are located on a front plane defined by the upright front posts 110 are each constituted by two sections foldably jointed together by means of the front joint member A.

At each of the upper and lower ends of the upright front posts 110, a front corner member 13 is provided to connect to an end of each of the horizontal bars 112 and 113. Similarly a rear corner member 17 is provided at each of the upper and lower ends of the upright rear posts 111 to connect to the associated horizontal bars 112 and 113 and braces 12.

The parallelepiped structure of the collapsible closet frame in accordance with the present invention further comprises a bracing structure 120 having four braces 12 respective extending from the upper and lower ends of the upright rear posts 111 and jointed together at a centrally-located brace joint C.

Figure 2:
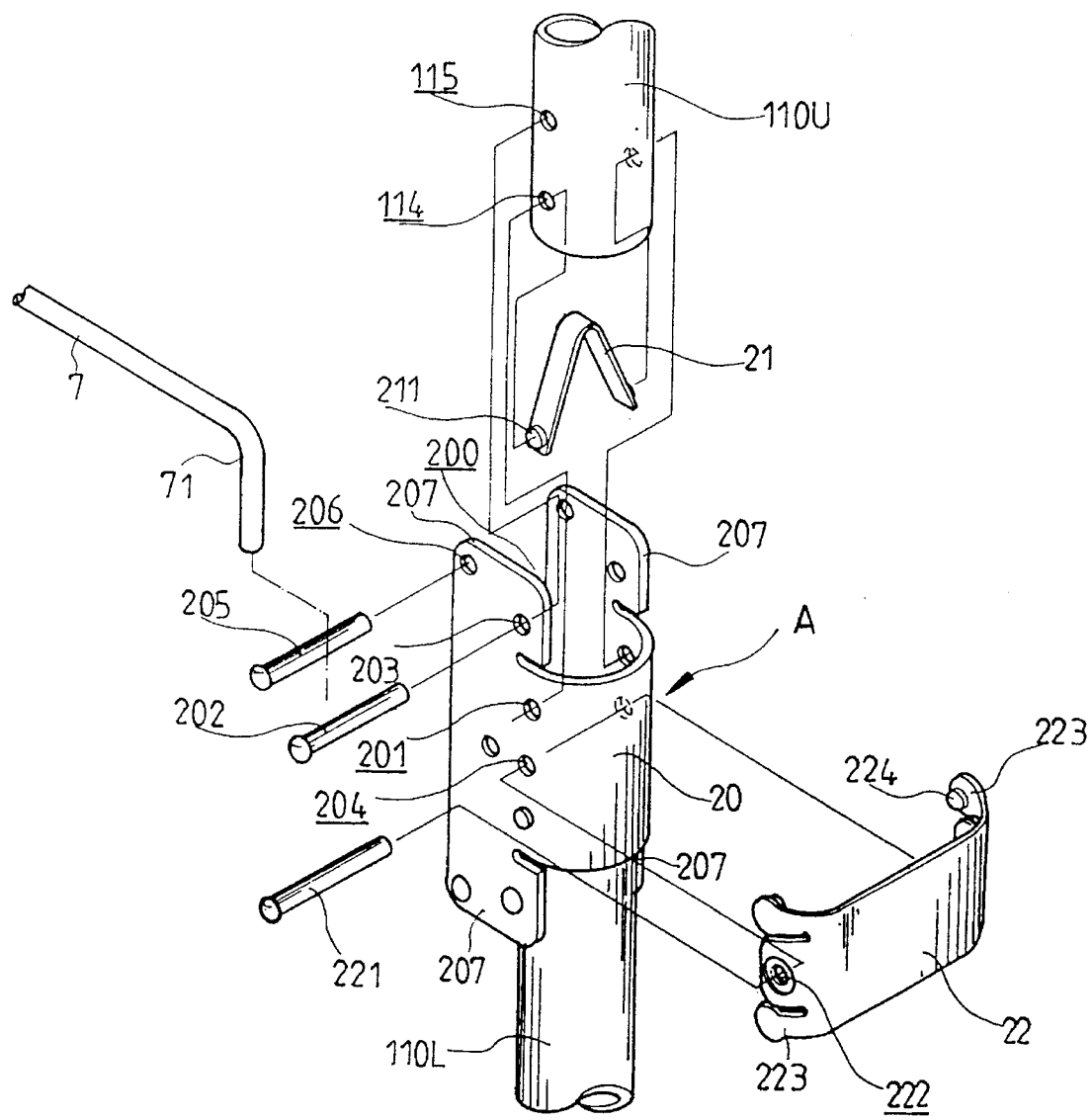
FIG. 2 is an exploded perspective view, in an enlarged scale, showing a front joint member of the collapsible closet frame structure.

With particular reference to FIG. 2 wherein a perspective view of the front joint member A is shown, the front joint member A comprises a U-shaped body 20 defining therein a channel 200 to receive ends of the upper section 110U and the lower section 110L of the respective upright front post 110. The body 20 comprises four side extensions 207 each having a hole 203 formed thereon to form two opposing hole pairs with a pivot pin 202 extending therethrough. The pivot pin 202 also extend through two opposing holes 115 formed on the respective one of the upper and lower sections 110U and 110L of the upright front post 110 so as to pivotally support the upper section 110U or lower section 110L of the upright front post 110 on the front joint member A.

A retainer 21, in the form of a V- or U-shaped leaf spring, having a peg 211 formed at each end thereof, is disposed within the end portion of each of the upper section 110U and the lower section 110L to bias the pegs 211 into two opposing holes 114 formed on the end portion of the section 110U or 110L. The body 20 of the front joint member A comprises two pairs of opposing holes 201 formed thereon, corresponding to the holes 114 of each of the post sections 110U and 110L so as to partially receive the pegs 211 therein for retaining the upper section 110U and the lower section 110L of the upright front post 110 in the expanded position as shown in FIG. 1.

Figure 10:
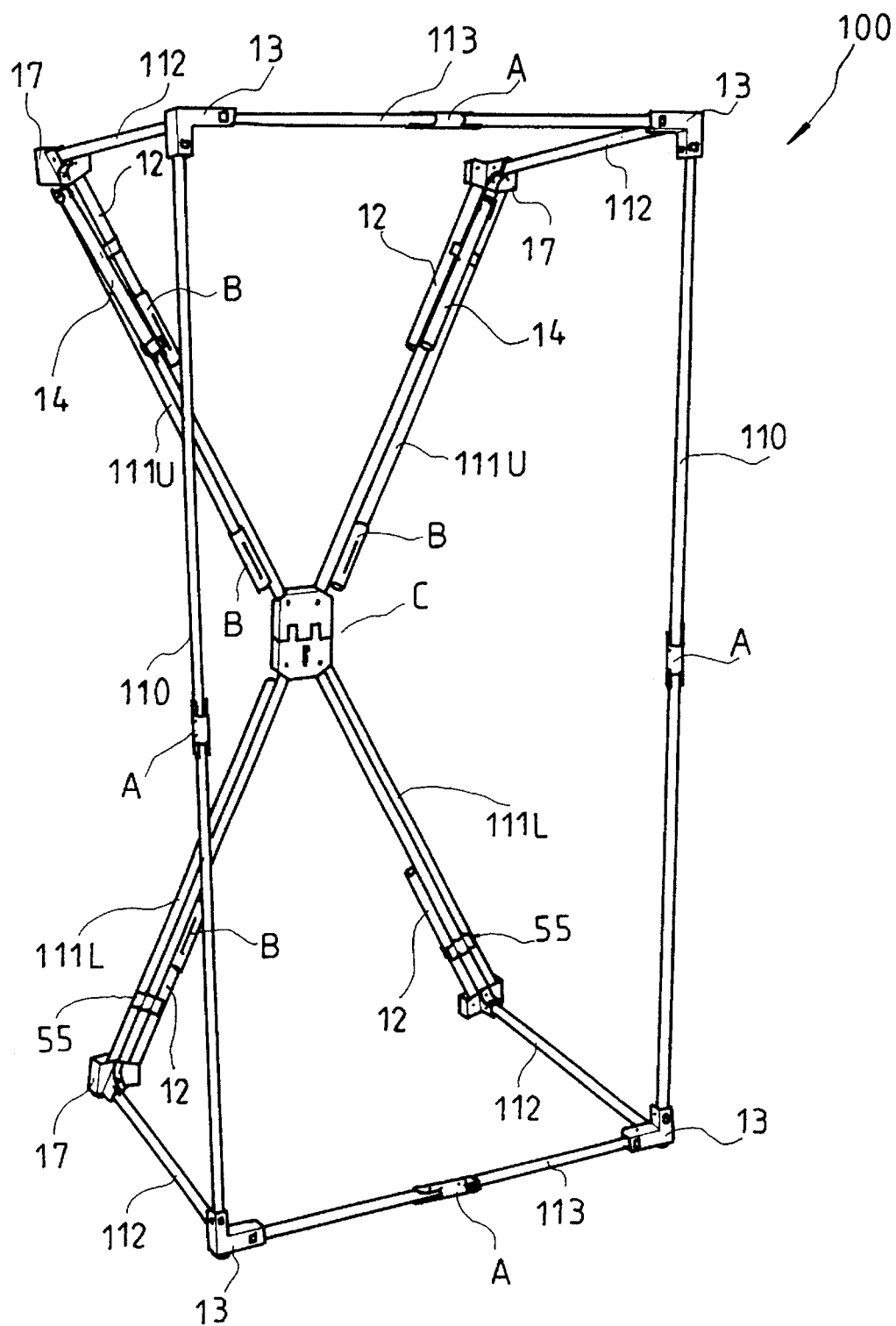
Figs. 10–12 are perspective views showing the sequence of collapsing the collapsible closet frame structure of the present invention.
Figure 11:
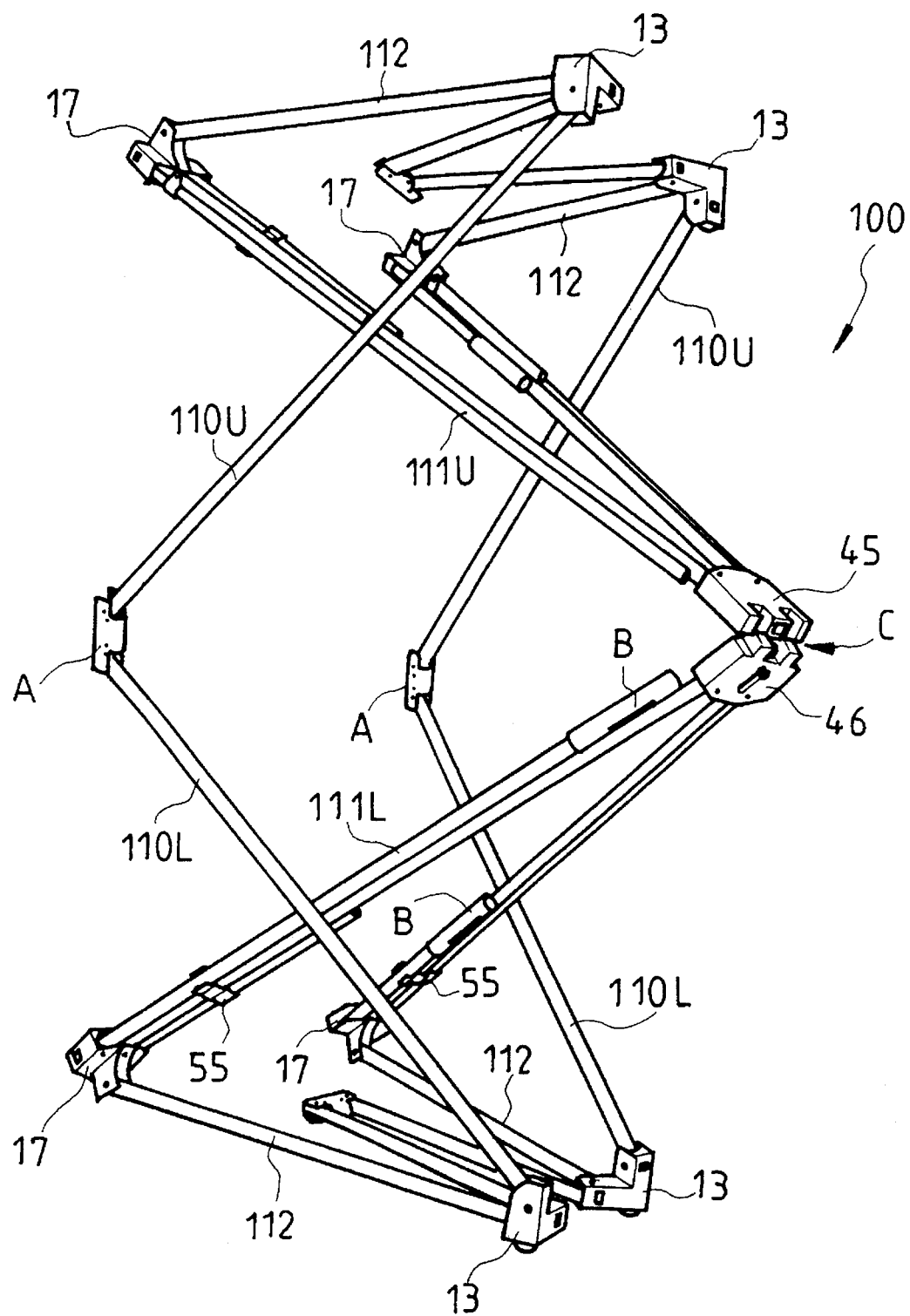
Figure 12:
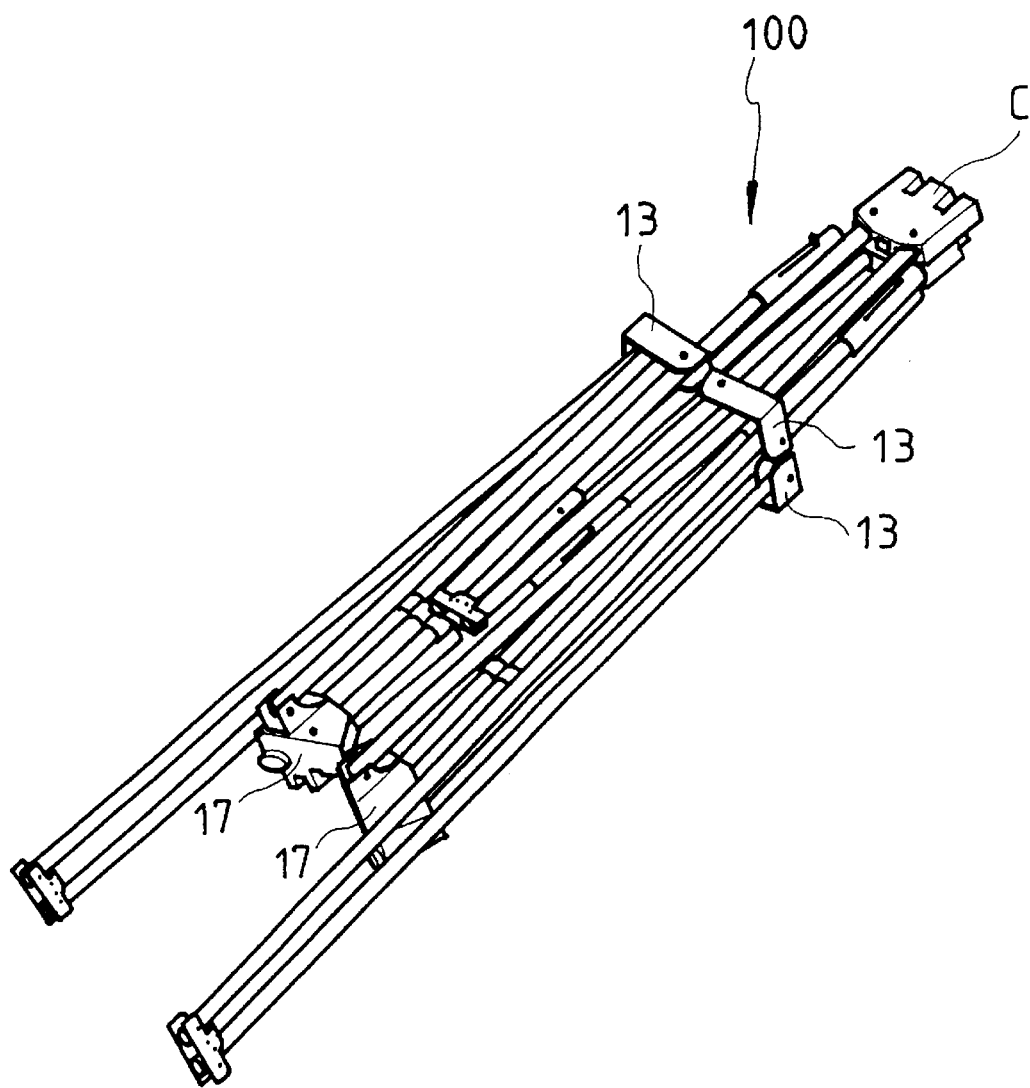

A release member 22 is secured on the body 20 of the front joint member A by means of a pin 221 extending through holes 222 formed on the release member 22 and holes 204 formed on the body 20. The release member 22 comprises four flaps 223, each being rotatable relative to the release member 22 and having an inward projection 224 opposing one of the holes 201 formed on the body 20 of the front joint member A so that by rotating the flaps 223 toward the body 20 to have the projections 224 contact and push the pegs 211 of the retainer 21 inward against the biasing force of the retainer 21, the upper section 110U and lower section 110L of the upright front post 110 are released and thus rotatable about the pivot pins 202 from the expanded position to the collapsed position, as shown in FIGS. 10–12.

The front joint member A may further comprise two fasteners 205 to each extend holes 206 formed the side extensions 207 to secure two opposing ones of the side extensions 207 of the body 20 together to provide a more secure structure.

Figures 3, 4:
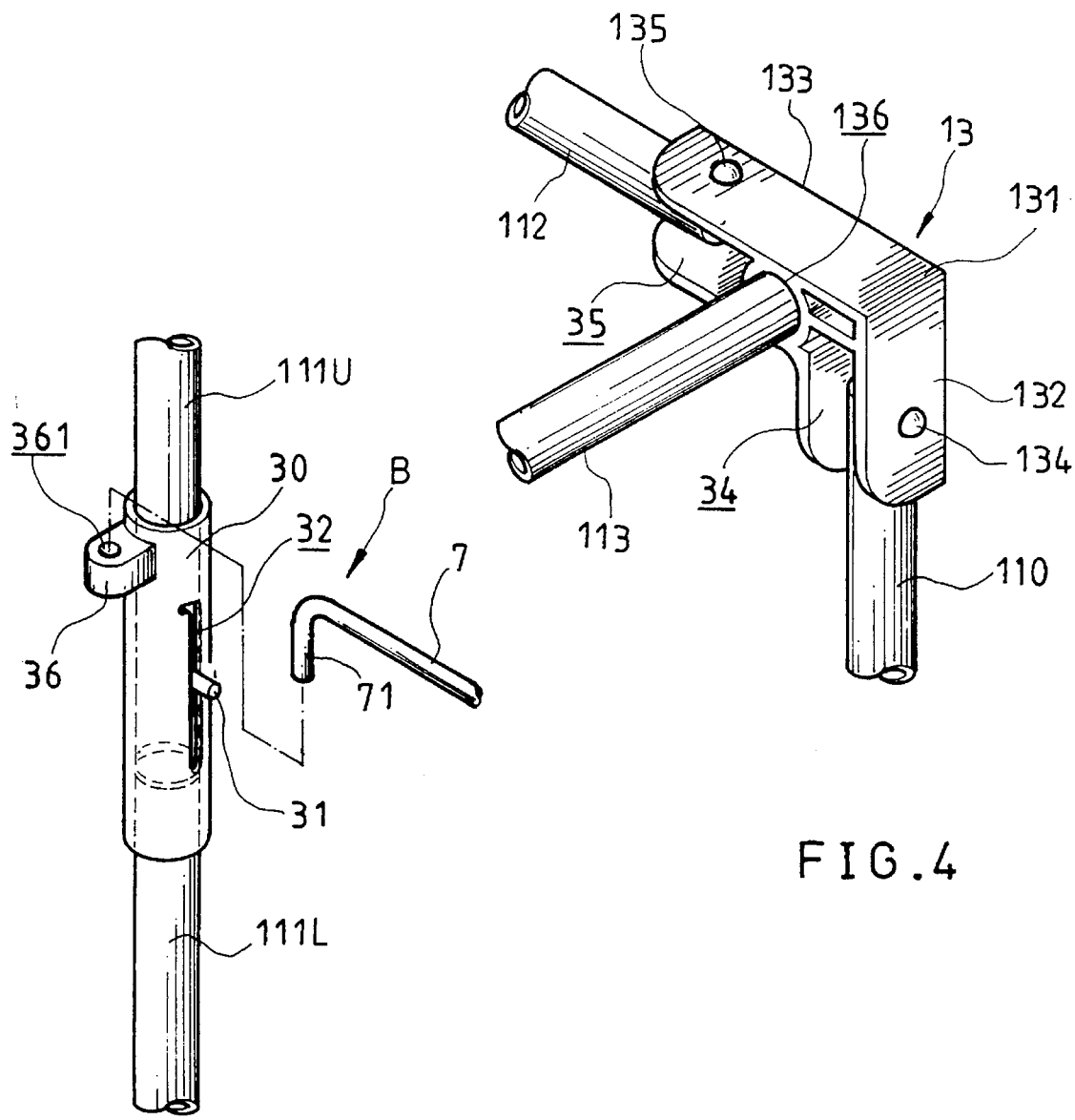
FIG. 3 is an enlarged perspective view showing a rear joint member of the collapsible closet frame structure.
FIG. 4 is an enlarged perspective view showing a front corner member of the collapsible closet frame structure.

With particular reference to FIG. 3, wherein a perspective view of the rear joint member B is shown, the rear joint member B comprises a tubular body 30 having two open ends to receive ends of the upper section 111U and the lower section 111L of a upright rear post 111. The tubular body 30 comprises an elongated slot 32 extending axially to movably receive therein a release bar 31 which pushes the upper section 111U out of engagement with the tubular body 30 when manually moved upward relative to the tubular body 30 so as to separate or detach the upper section 111U of the upright rear post 111 from the lower section 111L.

With particular reference to FIG. 4, wherein a perspective view of the front corner member 13 is shown, the front corner member 13 comprises an L-shaped body 131 having two perpendicular legs 132 and 133, each having a slot 34 or 35 formed thereon to rotatably receive and retain therein end portions of an upright front post 110 and a horizontal bar 112 by means of a pivot pin 134 or 135. The L-shaped body 131 has a hole 136 extending in a direction normal to both the two slots 34 and 35 for receiving and securing therein an end portion of an associated horizontal bars 113.

Figure 9:
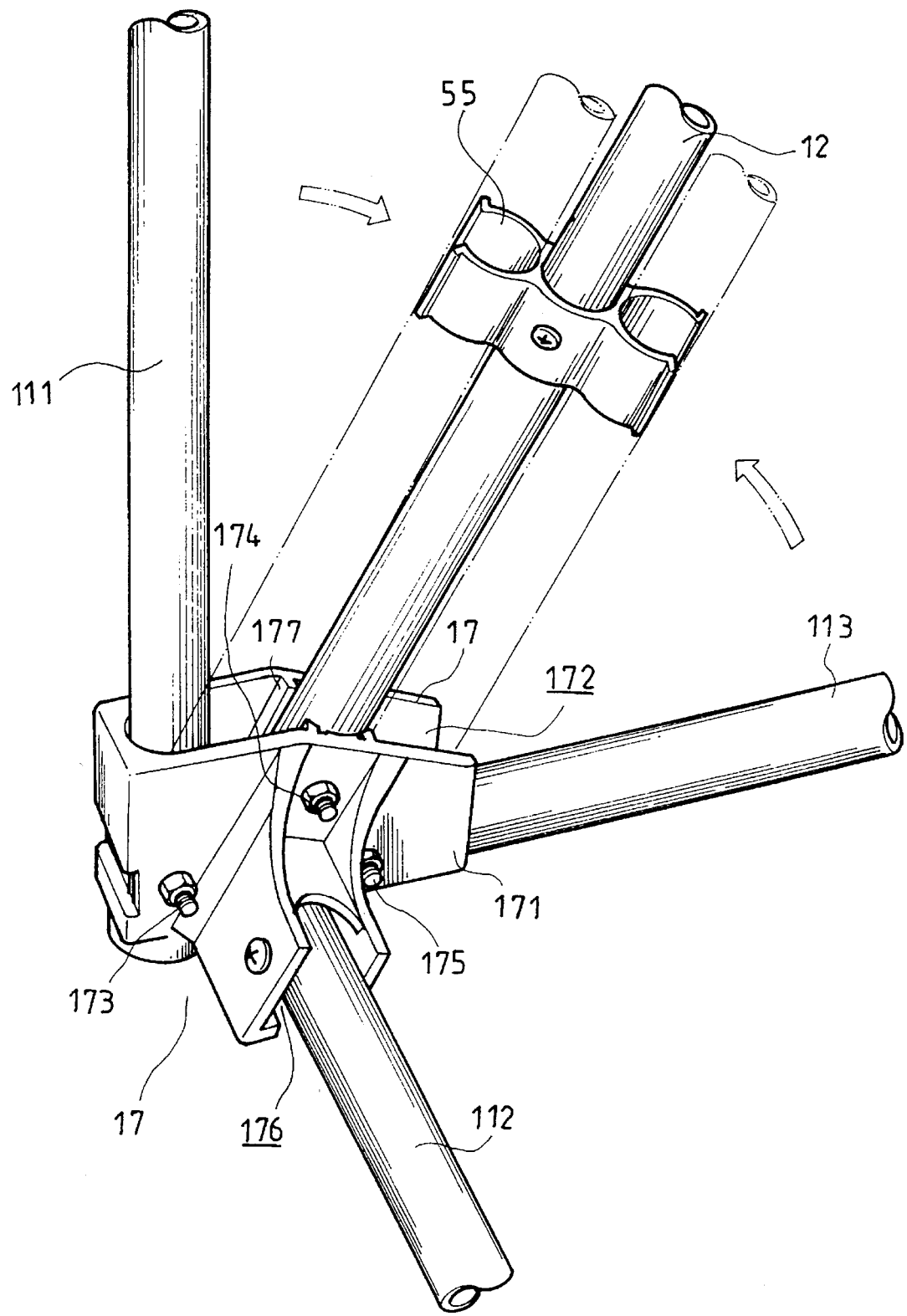
FIG. 9 is an enlarged perspective view showing a rear corner member.

With particular reference to FIG. 9, wherein a perspective view of the rear corner member 17 is shown, the rear corner member 17 comprises two parallel plates 171 defining therebetween a recess 172 for pivotally receiving and retaining therein end portions of an upright rear post 111, a brace 12 and a horizontal bar 113 by means of pivot pins 173, 174 and 175. The rear corner member 17 further comprises a recess 176, substantially normal to the plates 171 for rotatably receiving and retaining therein an associated horizontal bar 112. Such an arrangement allows all the members, such as the brace, the horizontal bars and the upright post, that are jointed by the rear corner member 17 to be rotatable relative to the rear corner member 17. However, preferably, the brace 12 is held fixed relative to the rear corner member 17 by means of fixed strips 177 formed inside the recess 172, as shown in FIG. 9, so that in collapsing the collapsible closet frame structure 100, the upright rear post 110 and the horizontal bar 113 are rotated toward the brace 12 and to be secured thereto by a holder 55 which is fixed on the brace 12.

Figure 5:
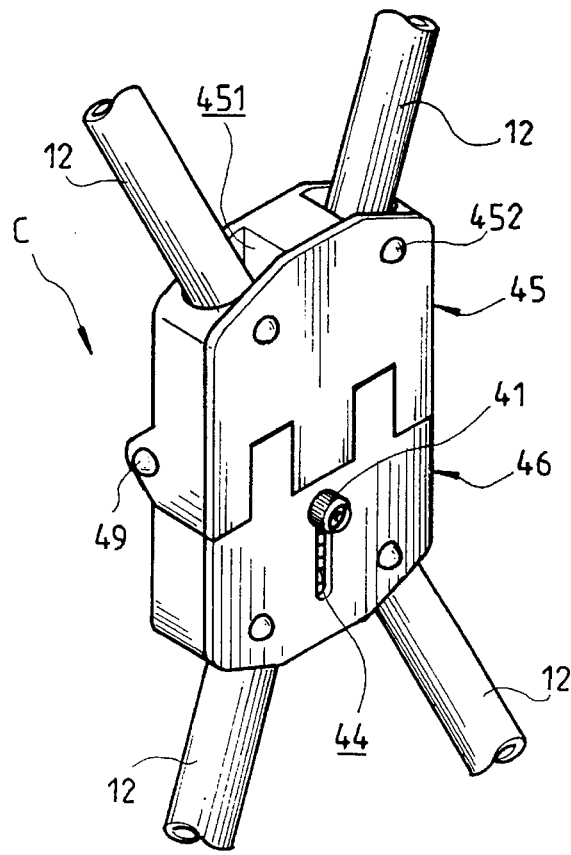
FIG. 5 is an enlarged perspective view showing a brace joint member of the collapsible closet frame structure.
Figure 6:
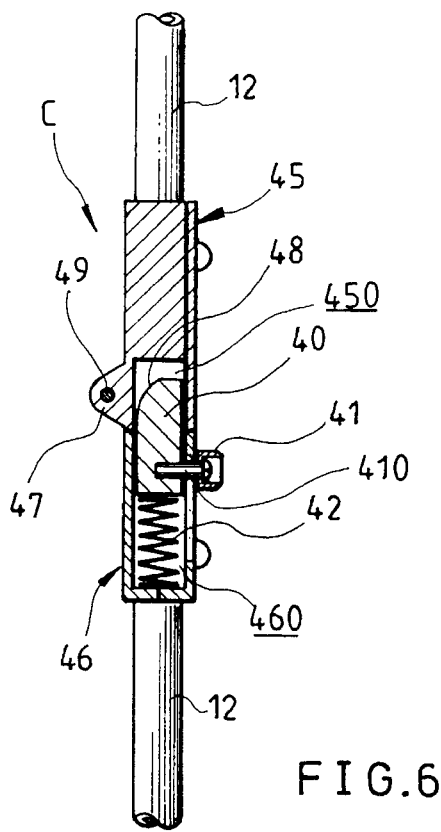
FIG. 6 is a cross-section view showing the brace joint member in thee expanded position.
Figure 7:
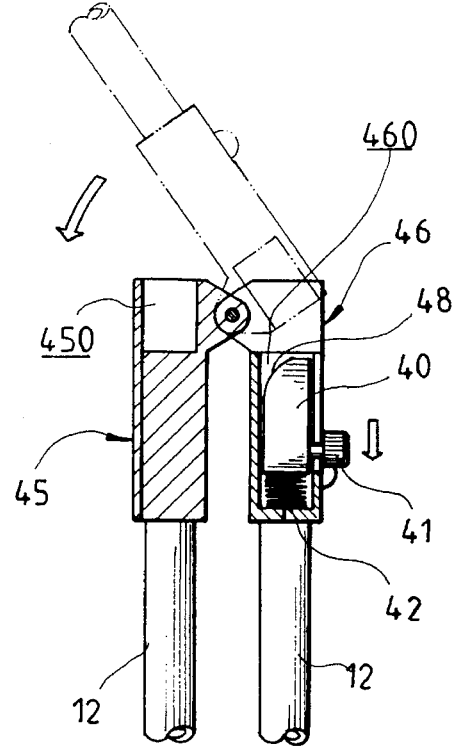
FIG. 7 is a cross-sectional view showing the brace joint member in the collapsed position.

Referring now to FIGS. 5–7, wherein the brace joint C and a portion of the four braces 12 pivoted thereto are shown, the brace joint C comprises an upper half 45 and a lower half 46 rotatably connected together by means of a pivot 49. Each of the upper and lower halves 45 and 46 comprises two bores 451 formed thereon to respectively receive an end of each of the braces 12. It is should be noted that in the drawings, only the bores 451 formed on the upper half 45 can be observed and those of the lower half 46 are invisible. The braces 12 are pivotally secured within the bores 451 by means of pivot pins 452. The bores 451 are elongated sideways to allow the braces 12 to be rotatably within the bores 451 about the pivot pins 452.

The mating edges of the upper half 45 and the lower half 46 preferably have staggered configurations which mate each other when the upper and lower halves 45 and 46 are in the expanded position (FIG. 5).

Inside the lower half 46, an interior chamber 460 is formed to slidably receive therein a slide 40 which is biased by spring 42 to protrude into and thus engage a recess 450 formed inside the upper half 45 so as to hold the upper and lower halves 45 and 46 in the expanded position (FIGS. 5 and 6). A bar 410 is mounted to the slide 40 and extend out of an elongated slot 44 on the lower half 46 with a knob 41 secured on the outside end thereof for manually moving the slide 40 against the biasing spring 42 to break the engagement between the slide 40 and the upper half 45 so as to release the upper half 45 and the lower half 46 from the expanded position and thus allowing the upper half 45 to rotate about the pivot 49 toward the lower half 46, as shown in FIG. 7.

To facilitate the movement of the slide 40 against the biasing spring 42, an arcuate camming surface 48 is provided on the slide 40. A corresponding camming member 47 (FIG. 6) is provided on the upper half 45 to act upon the camming surface 48 during the rotation of the upper half 45 relative to the lower half 46 from the expanded position shown in FIG. 6 toward the collapsed position shown in FIG. 7.

With the above described arrangement, to collapse the closet frame structure 100 of the present invention, the two sections 111U and 111L of the upright rear posts 111 and those of the horizontal bars 113 that are located on the rear plane defined by the upright rear posts 111 are separated or detached from each other (FIG. 10). The brace joint C is then released from the expanded position and the two sections 110U and 110L of the upright front posts 110 and those of the horizontal bars 113 that are located on the front plane are then released to fold about the respective front joint member A (FIG. 11) so as to allow the whole closet frame structure 100 to collapse toward the final collapsed position (FIG. 12).

To provide a more sound structure, the collapsible closet frame structure 100 may also be provided with a horizontal reinforcement bar 7 which extends between each of the upright front post 110 and the respective upright rear post 111. Each of the reinforcement bars 7 has two bent ends 71 of which one engages a hole 361 formed on a side lug 36 of the tubular body 30 of the rear joint member B and the other end hooking on and thus supported by one of the fasteners 205 of the front joint member A. By such an arrangement, the reinforcement bars 7 securely hold the front and rear posts 110 and 111 together.

Figure 8:
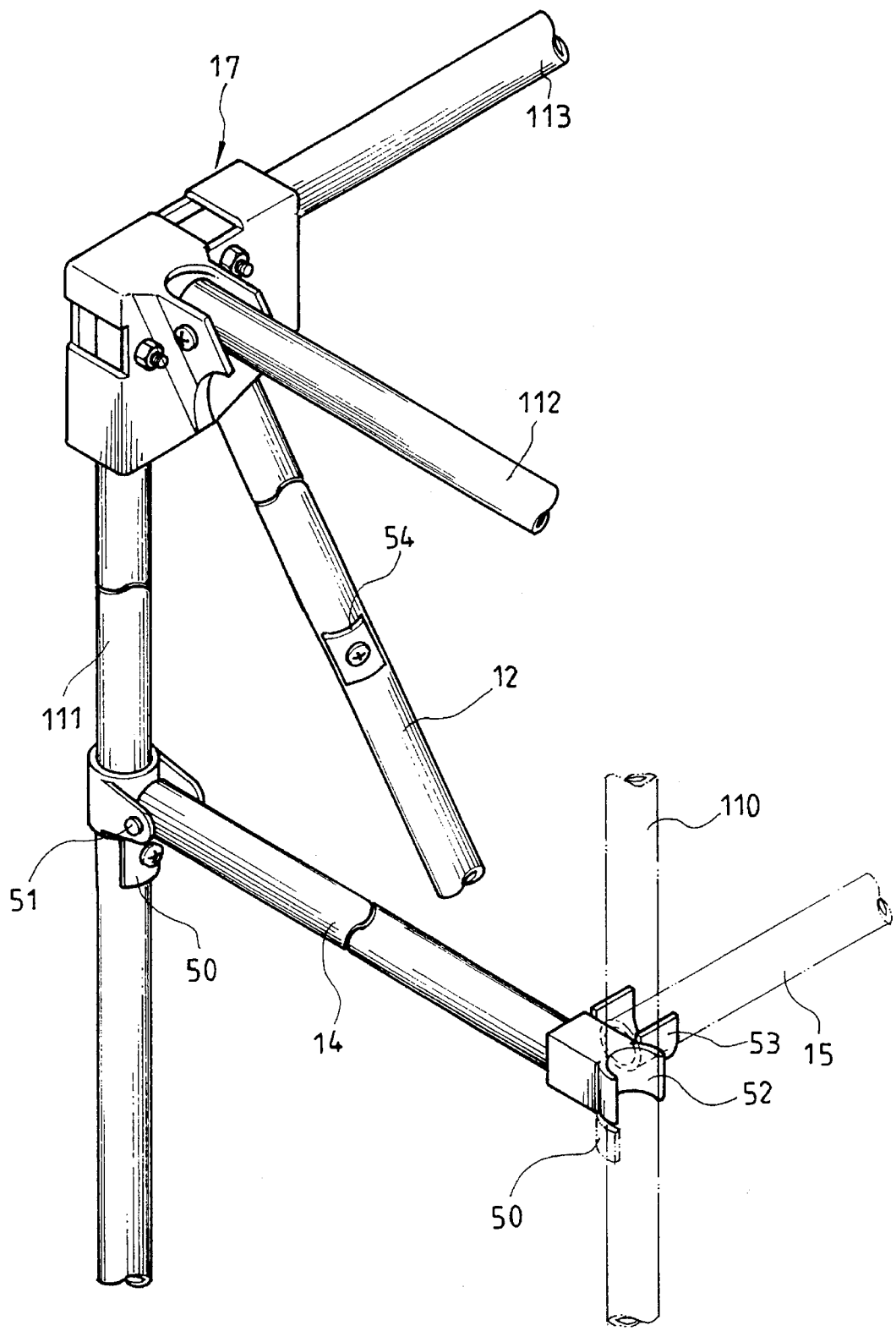
FIG. 8 is a partially perspective view, in an enlarged scale, of the collapsible closet frame structure, showing a partition plate support bar.

The collapsible closet frame structure 100 of the present invention may further comprise horizontal partition means which comprises a pair of parallel side bars 14 each extending between an upright front post 110 and a corresponding upright rear post 111, as shown in FIG. 8. The side bars 14 have one end pivoted to the upright rear post 111 by means of a pivot 51 and a second end having a connector 52 mounted thereto. The connector 52 has a semi-circular recess for partially engaging the upright front post 110. The connector end of the side bar 14 is supported by a supporting member 50 fixed on the upright front post 110.

The connector 52 of the side bar 14 is also provided with a holder portion 53 which defines an upward opening for receiving and supporting an end of a further bar 15 thereon so as to allow the further bar 15 to extend horizontally between the two upright front posts 110 and flush with the side bars 14. The further bar 15 constitutes part of the partition means.

The partition means further comprises support pieces 54 secured on the braces 12 to be flush with the side bars 14 and the further bar 15. With such an arrangement, a partition plate (not shown) may be disposed and supported on the side bars 14, the further bar 15 and the supporting pieces 54 secured on the braces 12 to separate the inside space of the collapsible closet frame structure 100 into two smaller, isolated spaces.

A hanging bar 6 may be provided to hang between the two side bars 14 for supporting clothe hangers (not shown).

It is quite apparent that a soft flexible material sheet may be attached to the closet frame structure 100 to cover the inside space thereof so as to complete the construction of the closet.

It is apparent that although the invention has been described in connection with the preferred embodiment, it is contemplated that those skilled in the art may make changes to the preferred embodiment without departing from the scope of the invention as defined in the appended claims.

What is claimed is:

1. A collapsible closet frame structure comprising:

two upright front posts each having an upper end and a lower end, each of which is pivotally mounted with a front corner member, and two upright rear posts each associated with one of the front posts and having an upper end and a lower end, each of which is pivotally mounted with a rear corner member, each of the front posts comprising two sections pivotally joined together by a front joint member and each of the rear posts comprising two sections detachably joined together by a rear joint member;

two pairs of first horizontally-extending bars, of which a first pair includes one bar extending between the upper ends of the front posts and a second bar extending between the lower ends of the front posts and joined to the front corner members mounted on the upper and lower ends of the front posts, each of the horizontally-extending bars of the first pair comprising two sections pivotally joined together by a front joint member, and a second pair of first horizontally-extending bars including one bar extending between the upper ends of the rear posts and a second bar extending between the lower ends of the rear posts and pivotally joined to the rear corner members mounted on the upper and lower ends of the rear posts, each of the horizontally-extending bars of the second pair comprising two sections detachably joined together by a rear joint member, two pairs of second horizontally-extending bars, of which a first pair extend between the upper ends of the front posts and the rear posts and secured at first ends to the front corner member and pivotally mounted at second ends to the rear corner members, and a second pair extend between the lower ends of the front posts and the rear posts and secured at first ends to the front corner members and pivotally mounted at second ends to the rear corner members;

a bracing structure comprising a brace extending from each of the rear corner members toward a substantially centrally-located brace joint member to be pivoted thereto;

the front joint member comprises a U-shaped body defining therein a channel to receive open ends of the two sections of the respective front posts or horizontally-extending bars, the two sections being pivotally secured within the channel with pivot means, two pairs of opposing latching holes on the body to correspond to latching holes on the open end of each of the two sections, a retainer comprising a leaf spring having two ends with outward projecting pegs formed thereon being received within the open end of each of the two sections to bias the pegs into latching holes on the body and the sections so as to prevent the sections from rotating about the pivot means and thus retain the sections in an expanded position, a release member secured on the joint body and having four flaps rotatable relative to the joint body, each of the flaps having an inward projection corresponding to one of the latching holes of the joint body so that when the flaps are pushed toward the joint body, the inward projections contact and thus push the pegs inward against the leaf spring to allow the two sections to rotate about the front joint member and thus release the two sections from the expanded position;

the rear joint member comprising a tubular body having two open ends to respectively receive therein an end of each of the two sections of the respective rear posts or horizontally-extending bars, a release bar extending out of the tubular body through an axially-extending slot on the tubular body and being manually operable to move relative to the tubular body for forcing one of the ends of the sections received within the tubular body out of engagement with the tubular body;

the front corner member comprising an L-shaped body having two perpendicular legs, each having a slot formed therein to pivotally receive therein ends of the front post and the associated second horizontally-extending bar, the L-shaped body further comprising a hole extending substantially normal to the two legs to securely receive therein the associated first horizontally-extending bar;

the rear corner member comprising two parallel plates defining therein a recess for receiving ends of the associated rear post, the associated brace and the associated first horizontally-extending bar of which the brace is fixed inside the recess and the rear post and the first horizontally-extending bar are pivoted to the plates, the rear corner member further comprising a recess to pivotally receive therein an end of the associated second horizontally-extending bar and providing for the second horizontally-extending bar to extend substantially normal to the rear post, the brace and the first horizontally-extending bar;

the brace joint comprising an upper half and a lower half pivoted together, the lower half having an interior chamber to slidably receive therein a slide which is spring biased to partially protrude into a recess defined inside the upper half and thus engage the upper half so as to retain the upper half and the lower half in the expanded position, a control bar connected to and extending from the slide through an elongated slot formed on the lower half with an end projecting out of the lower half, a knob mounted to the outside end of the control bar to be manually operable for moving the slide against the biasing spring to break the engagement between the upper half and the lower half.

2. The collapsible closet frame structure as claimed in claim 1, further comprising a reinforcement bar extending between each of the front posts and the associated rear post, the reinforcement bar having two bent ends, one of which engages a hole on the tubular body of the rear joint member mounted on the rear post and the other bent end hooking on and thus supported by the front joint member mounted on the front post.

3. The collapsible closet frame structure as claimed in claim 1, further comprising holder means mounted on each of the braces so as to hold the associated first horizontally-extending bar and rear post when the later two are rotated relative to the associated rear corner member toward the brace.

4. The collapsible closet frame structure as claimed in claim 1, further comprising two side bars each connecting between one of the front posts and the associated rear post, a further bar connecting between the two front posts and flush with the side bars and two supporting pieces each mounted to one of the braces to be flush with the side bars and the further bar so as to be adapted to support thereon a partition plate.

5. The collapsible closet frame structure as claimed in claim 4, wherein the joint body of the front joint member comprises a plurality of fasteners extending between two sides of the U shape to secure the two sides from separation.

6. The collapsible closet frame structure as claimed in claim 5, further comprising a reinforcement bar extending between each of the front posts and the associated rear post, the reinforcement bar having two bent ends, one of which engages a hole on the tubular body of the rear joint member mounted on the rear post and the other bent end hooking on and thus supported by one of the fasteners.

7. The collapsible closet frame structure as claimed in claim 4, further comprising a hanging bar extending between the two side bars to be adapted to support thereon clothes hangers.

8. A collapsible closet frame structure comprising:

two upright front posts each having an upper end and a lower end, each of which is pivotally mounted with a front corner member, and two upright rear posts each associated with one of the front posts and having an upper end and a lower end, each of which is pivotally mounted with a rear corner member, each of the front posts comprising two sections pivotally joined together by a front joint member and each of the rear posts comprising two sections detachably joined together by a rear joint member;

two pairs of first horizontally-extending bars, of which a first pair includes one bar extending between the upper ends of the front posts and a second bar extending between the lower ends of the front posts and joined to the front corner members mounted on the upper and lower ends of the front posts, each of the horizontally-extending bars of the first pair comprising two sections pivotally joined together by a front joint member, and a second pair of first horizontally extending bars including one bar extending between the upper ends of the rear posts and a second bar extending between the lower ends of the rear posts and pivotally joined to the rear corner members mounted on the upper and lower ends of the rear posts, each of the horizontally-extending bars of the second pair comprising two sections detachably joined together by a rear joint member, two pairs of second horizontally-extending bars, of which a first pair extend between the upper ends of the front posts and the rear posts and secured at first ends to the front corner members and pivotally mounted at second ends to the rear corner members and a second pair extend between the lower ends of the front posts and the rear posts and secured at first ends to the front corner members and pivotally mounted at second ends to the rear corner members; and a bracing structure comprising a brace extending from each of the rear corner members toward a substantially centrally-located brace joint member to be pivoted thereto.

9. The collapsible closet frame structure as claimed in claim 8, wherein the front joint member comprising a U-shaped body defining therein a channel to receive open ends of the two sections of the respective front posts or horizontally-extending bars, the two sections being pivotally secured within the channel with pivot means, two pairs of opposing latching holes on the body to correspond to latching holes on the open end of each of the two sections, a retainer comprising a leaf spring having two ends with outward projecting pegs formed thereon being received within the open end of each of the two sections to bias the pegs into latching holes on the body and the sections so as to prevent the sections from rotating about the pivot means and thus retain the sections in an expanded position, a release member secured on the joint body, and having four flaps rotatable relative to the joint body, each of the flaps having an inward projection corresponding to one of the latching holes of the joint body so that when the flaps are pushed toward the joint body, the inward projections contact and thus push the pegs inward against the leaf spring to allow the two sections to rotate about the front joint member and thus release the two sections from the expanded position.

10. The collapsible closet frame structure as claimed in claim 8, wherein the rear joint member comprising a tubular body having two open ends to respectively receive therein an end of each of the two sections of the respective rear posts or horizontally-extending bars, a release bar extending out of the tubular body through an axially-extending slot on the tubular body and being manually operable to move relative to the tubular body for forcing one of the ends of the sections received within the tubular body out of engagement with the tubular body.

11. The collapsible closet frame structure as claimed in claim 8, wherein the front corner member comprising an L-shaped body having two perpendicular legs, each having a slot formed therein to pivotally receive therein ends of the front post and the associated second horizontally-extending bar, the L-shaped body further comprising a hole extending substantially normal to the two legs to securely receive therein the associated first horizontally-extending bar.

12. The collapsible closet frame structure as claimed in claim 8, wherein the rear corner member comprising two parallel plates defining therein a recess for receiving ends of the associated rear post, the associated brace and the associated first horizontally-extending bar of which the brace is fixed inside the recess and the rear post and the first horizontally-extending bar are pivotable to the plates, the rear corner member further comprising a recess to pivotally receive therein an end of the associated second horizontally-extending bar and providing for the second horizontally-extending bar to extend substantially normal to the rear post, the brace and the first horizontally-extending bar.

13. The collapsible closet frame structure as claimed in claim 8, wherein the brace joint comprising an upper half and a lower half pivoted together, the lower half having an interior chamber to slidably receive therein a slide which is spring biased to partially protrude into a recess defined inside the upper half and thus engage the upper half so as to retain the upper half and the lower half in the expanded position, a control bar connected to and extending from the slide through an elongated slot formed on the lower half with an end projecting out of the lower half, a knob mounted to the outside end of the control bar to be manually operable for moving the slide against the biasing spring to break the engagement between the upper half rand the lower half.

* * * * *